Figure 1:
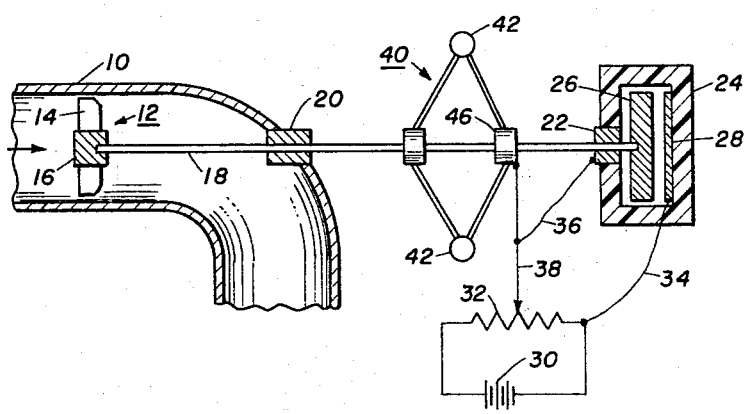

Sept. 27, 1966    P. ANDRESS, JR    3,275,037

FLUID FLOW CONTROL DEVICE

Filed Jan. 10, 1964

INVENTOR.
PETER ANDRESS, JR.
BY
ATTORNEY.

United States Patent Office 3,275,037
Patented Sept. 27, 1966

3,275,037
FLUID FLOW CONTROL DEVICE
Peter Andress, Jr., Arlington Heights, Ill., assignor, by mesne assignments, to Union Oil Company of California, Los Angeles, Calif., a corporation of California
Filed Jan. 10, 1964, Ser. No. 336,978
9 Claims. (Cl. 138—46)

This invention relates to a fluid flow control device and, more particularly, to an apparatus employing a field-responsive fluid for controlling the rate of fluid flow through a conduit. Electro-viscous fluids are especially useful as the field-responsive fluids in the apparatus of this invention.

Certain fluids, which are herein designated "field-responsive liquids," respond to the application of the appropriate field by instantaneously, but reversibly, changing in apparent bulk viscosity. More specifically, the term field-responsive fluid denotes both electro-viscous fluids (sold under the trademark of Electro Fluid) which display a dramatic change in apparent bulk modulus in response to the presence of an electric field and magnetic fluids which display a similar change in apparent bulk modulus in response to the presence of magnetic fields. The field-responsive fluids increase in bulk viscosity in proportion to the strength of the applied field, i.e., they increase in bulk viscosity as the strength of the applied field increases. In the presence of strong fields, the fluids thicken into a semi-solid or solid condition. The energized field-responsive fluids serve to transmit force from one moving coupling member to a second coupling member. Electro-viscous fluids and magnetic fluids are described in U.S. Patents 2,661,596 and 2,886,151 and electro-viscous fluids are also described in U.S. Patent 3,047,507.

It is desirable in many industrial applications to automatically control the speed at which a fluid, e.g., a liquid obtained from a source of varying head, flows through a conduit. This invention is based on an apparatus utilizing a field-responsive fluid for controlling the rate of flow of a fluid through a conduit. The apparatus of this invention includes a fluid conduit in which is disposed a rotor for converting a part of the kinetic energy of linear or axial flow of a fluid through the conduit into rotational kinetic energy. The rotor is mechanically connected to a rotatable member of a field-responsive fluid coupling so that the rotatable member is rotatable with the rotor. The coupling also includes a stationary member which is substantially uniformly spaced from the rotatable member and a field-responsive fluid, e.g., an electro-viscous fluid, disposed in the space between the rotatable and stationary members of the coupling. An electric circuit, including a governor responsive to the speed of rotation of the rotor, is used to subject the field-responsive fluid to the appropriate field (e.g., an electric field in the case of an electro-viscous fluid) in proportion to the linear flow rate of the fluid through the conduit. Therefore, as the rate of the fluid flow through the conduit increases, the field-responsive fluid coupling exerts a drag torque on the rotor in proportion to the linear flow rate of the fluid.

It is therefore an object of this invention to provide a fluid flow control device.

Another object of this invention is to provide an apparatus utilizing a field-responsive fluid for controlling the rate of fluid flow.

Still another object of this invention is to provide an apparatus for controlling the rate of fluid flow wherein a field-responsive-liquid-containing brake is utilized to exert a drag torque on a rotor disposed in a fluid conduit in proportion to the flow rate of the fluid.

Figure 2:
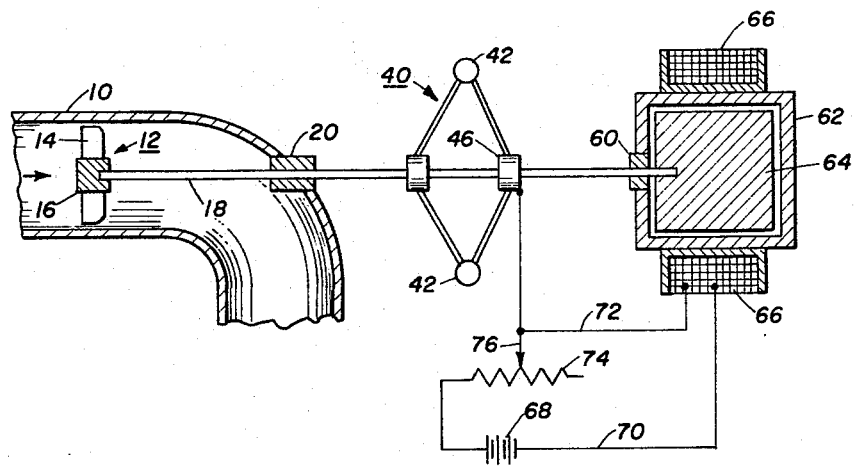

These, and further objects of this invention, will become apparent or be described as the description thereof herein proceeds and reference is made to the accompanying drawings in which:

FIGURE 1 is an elevational view, partly schematic and partly in section, of a fluid flow control device utilizing an electro-viscous fluid brake, and FIGURE 2 is an elevational view, partly schematic and partly in section, of a fluid flow control device utilizing a magnetic fluid brake.

Referring to FIGURE 1, the reference numeral 10 designates a conduit through which a fluid is flowing in the direction indicated by the arrow. Disposed in conduit 10 is rotor 12 carrying blades 14 positioned at equally spaced intervals about hub 16. Rotor 12, which is mounted on rotatable shaft 18, is so designed that it is rotated by the axial flow of fluid in conduit 10. Shaft 18 extends axially of rotor 12 and passes through bearing 20 in the wall of conduit 10 in fluid-tight relationship therewith.

The end of shaft 18 extending out of conduit 10 passes in fluid-tight relationship through electrically-conductive bearing 22 into nonrotatable brake housing 24, which is fabricated of an electrically insulating material. Axially supported on the end of shaft 18 within housing 24 so that it is rotatable with rotor 12 is electrically-conductive disk 26. Disk 26 is substantially uniformly spaced from electrically-conductive, nonrotatable plate 28. An electro-viscous fluid is confined in the space between rotatable disk 26 and stationary plate 28.

Battery 30 and potentiometer 32 provide means for subjecting the electro-viscous fluid confined between disk 26 and plate 28 to an electric potential. Plate 28 is connected directly by lead wire 34 to potentiometer 32, while disk 26 is connected through shaft 18, bearing 22, and lead wire 36 to slide 38 of potetiometer 32. It will be evident that at least the portion of shaft 18 extending from bearing 22 to rotatable disk 26 must be electrically conductive. The potential applied between disk 26 and plate 28 is automatically regulated in response to the rate of fluid flow by governor 40 which is mounted on shaft 18. Governor 40 is a spring-biased governor of the usual design with fly balls 42 and slidable governor sleeve 46. Slide 38 is mounted on slidable sleeve 46 so that the horizontal movement of sleeve 46, caused by a change in the centrifugal force exerted on fly balls 42 due to a change in the rotational speed of rotor 12, will automatically change the potential to which the confined electro-viscous fluid is subjected.

In the operation of the apparatus illustrated in FIGURE 1, the axial flow of a fluid in conduit 10 will impart radial motion to rotatable disk 26 through rotor 12 and shaft 18. This rotation of disk 26 with respect to plate 28 will shear the electro-viscous fluid confined between disk 26 and plate 28. The electro-viscous fluid under shear will exert a drag torque on rotor 12 to retard the axial flow of the fluid in conduit 10, which drag torque will be proportional to the viscosity of the electro-viscous fluid being sheared. The viscosity of the electro-viscous fluid will automatically be varied by governor 40 as the rotational speed of rotor 12 varies due to changes in the flow rate. It will be evident that the desired characteristics of the fluid flow in conduit 10 will determine how the potential applied to the electro-viscous fluid is to be varied as the flow rate varies and hence how battery 30 is to be connected through potentiometer 32 between disk 26 and plate 28. For example, if it is desired that the drag torque exerted on rotor 12 be proportionally greater at higher speeds than at moderate speeds to maintain a substantially constant flow rate, the connection is made so that slide 38 is moved by governor 40 to increase the potential applied to the electro-viscous fluid as the speed of rotor 12 increases.

Although the device of this invention utilizing a field-responsive fluid brake has been described in relation to a specific embodiment, it will be apparent that obvious modifications may be made by one skilled in the art without departing from the intended scope of this invention. For example, while the brake has been described as including two members having opposing flat surfaces between which the electro-viscous fluid is sheared, obvious modifications, such as utilizing two members having opposing cylindrical surfaces between which the field-responsive fluid is sheared, would be obvious. Other governor means for regulating the potential to which the electro-viscous fluid is subjected will also be apparent to one skilled in the art. It is not necessary that the rotor and shaft be located within the conduit in the vicinity of a bend thereof. Housing 24 may be fabricated of a conductive material, provided housing 24 and disk 26 are maintained electrically insulated from each other. The space between the opposing shearing surfaces will generally be about 0.002 to 0.2 inch, although other spacing may be used. Governor 40 may be mounted on a second shaft which is mechanically connected to a second rotor in conduit 10 so that there are separate rotors in the conduit for sensing and controlling the flow rate.

Reference is now made to FIGURE 2 which illustrates a fluid flow control device utilizing a magnetic fluid brake. Impeller 12, which is secured to an end of rotatable shaft 18, includes blades 14 mounted on hub 16 so that it is rotated by the axial flow of a fluid through conduit 10 in the indicated direction. Shaft 18 passes in fluid-tight relationship through bearing 20 in a wall of conduit 10 and through bearing 60 into nonrotatable, hollow cylindrical, brake housing 62. Secured to the end of shaft 18 within housing 62 is cylinder 64 which is spaced from and concentric with the interior surface of housing 62. A magnetic fluid is confined between housing 62 and cylinder 64.

Disposed around the exterior of housing 62 is magnetic coil 66 which is used to subject the confined magnetic fluid to a magnetic field. The energizing current is supplied to coil 66 from battery 68 through lead wires 70 and 72. The intensity of the magnetic field to which the confined magnetic fluid is subjected is regualted by the current as controlled by rheostat 74. Slide 76 of rheostat 74 is connected to slidable sleeve 46 of governor 40 so that the energizing current supplied to magnetic coil 66 is automatically regulated in response to the rotational speed of rotor 12, and hence by the rate of fluid flow through conduit 10.

The operation of this embodiment is similar to the operation of the embodiment of FIGURE 1 except that the desired characteristics of the fluid flow in conduit 10 are obtained by governor 40 and rheostat 74 varying the intensity of the magnetic field applied by coil 66 to the magnetic fluid in the brake in response to changes in the rotational speed of rotor 12. For example, where it is desired to maintain the rate of fluid flow substantially constant, that is, where it is desired that the drag torque exerted on rotor 12 be proportionally greater at higher speeds than at moderate speeds, rheostat 74 will be connected by lead wires 70 and 72 to coil 66 so that the magnetic field produced by coil 66 will be increased as the speed of rotation of rotor 12 increases.

The embodiments of the invention in which an exclusive property or privilege is claimed are defined as follows:

1. A fluid flow control device comprising a conduit, rotor means disposed in said conduit for rotation by the axial flow of a fluid through said conduit, a coupling including a rotatable member and a nonrotatable member having spaced opposing surfaces and a field-responsive fluid confined between said surfaces, said rotatable member being mechanically connected to said rotor means and rotatable therewith, means for applying to said field-responsive fluid a field adapted to increase the viscosity thereof, and governor means responsive to the rate of fluid flow in said conduit to vary the field applied to said field-responsive fluid.

2. A fluid flow control device in accordance with claim 1 in which said rotor means and rotatable member are connected by a shaft and said governor means is responsive to the speed of rotation of said shaft.

3. A fluid flow control device in accordance with claim 2 in which said field-responsive fluid is a magnetic fluid, and said means for applying a field to field-responsive fluid is adapted to subject said magnetic fluid to a magnetic field.

4. A fluid flow control device in accordance with claim 3 in which said means for applying a magnetic field comprises a coil and a D.C. potential source.

5. A fluid flow control device in accordance with claim 2 in which said field-responsive fluid is an electro-viscous fluid, and said means for applying a field to said field-resonsive fluid is adapted to subject said electro-viscous fluid to an electric field.

6. A fluid flow control device in accordance with claim 5 in which the opposing surfaces of said members are electrically conductive.

7. A fluid flow control device in accordance with claim 6 in which said means for applying an electric field comprises a D.C. potential source connected to said electrically conductive surfaces.

8. A fluid flow control device in accordance with claim 2 in which said members have opposing cylindrical surfaces.

9. A fluid flow control device in accordance with claim 2 in which said members have opposing flat surfaces.

References Cited by the Examiner
UNITED STATES PATENTS

| | | | |
|---|---|---|---|
| 547,369 | 10/1895 | Brady | 188—182 X |
| 1,870,849 | 8/1932 | Hodgson | 138—37 X |
| 2,622,707 | 12/1952 | Faus | 180—90 |

LAVERNE D. GEIGER, *Primary Examiner.*

C. HOUCK, *Examiner.*